June 2, 1925.
W. A. GIBBS
ANIMAL TRAP
Filed Nov. 12, 1920
1,540,691
4 Sheets-Sheet 3
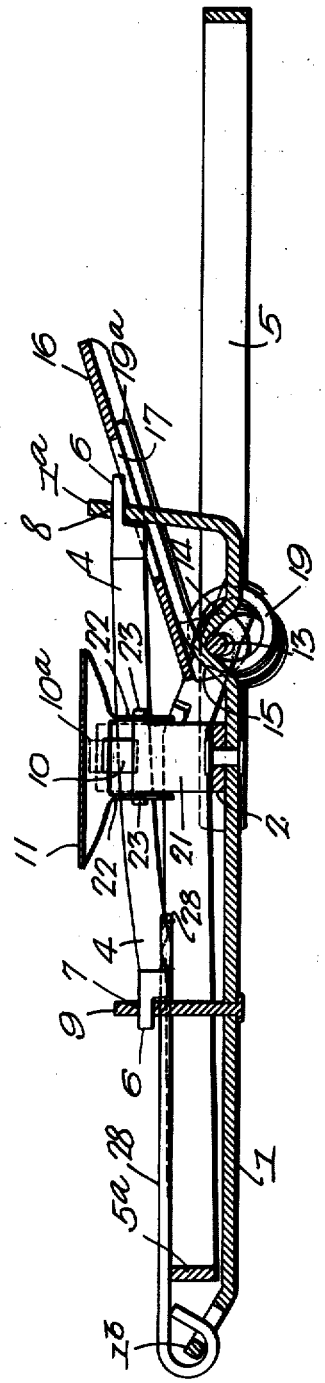
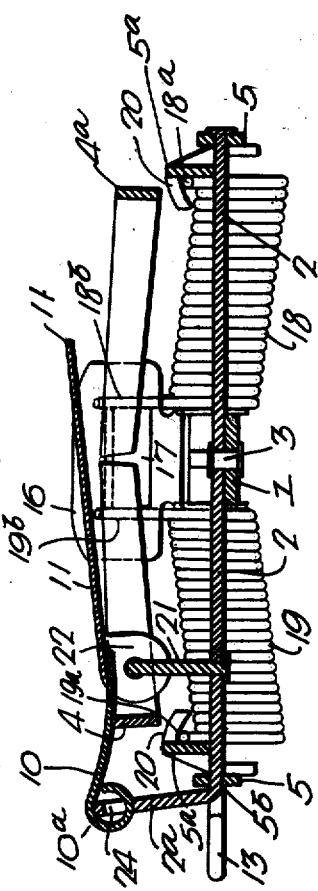
Inventor.—
Walter A. Gibbs.
by his Attorneys
Howson & Howson

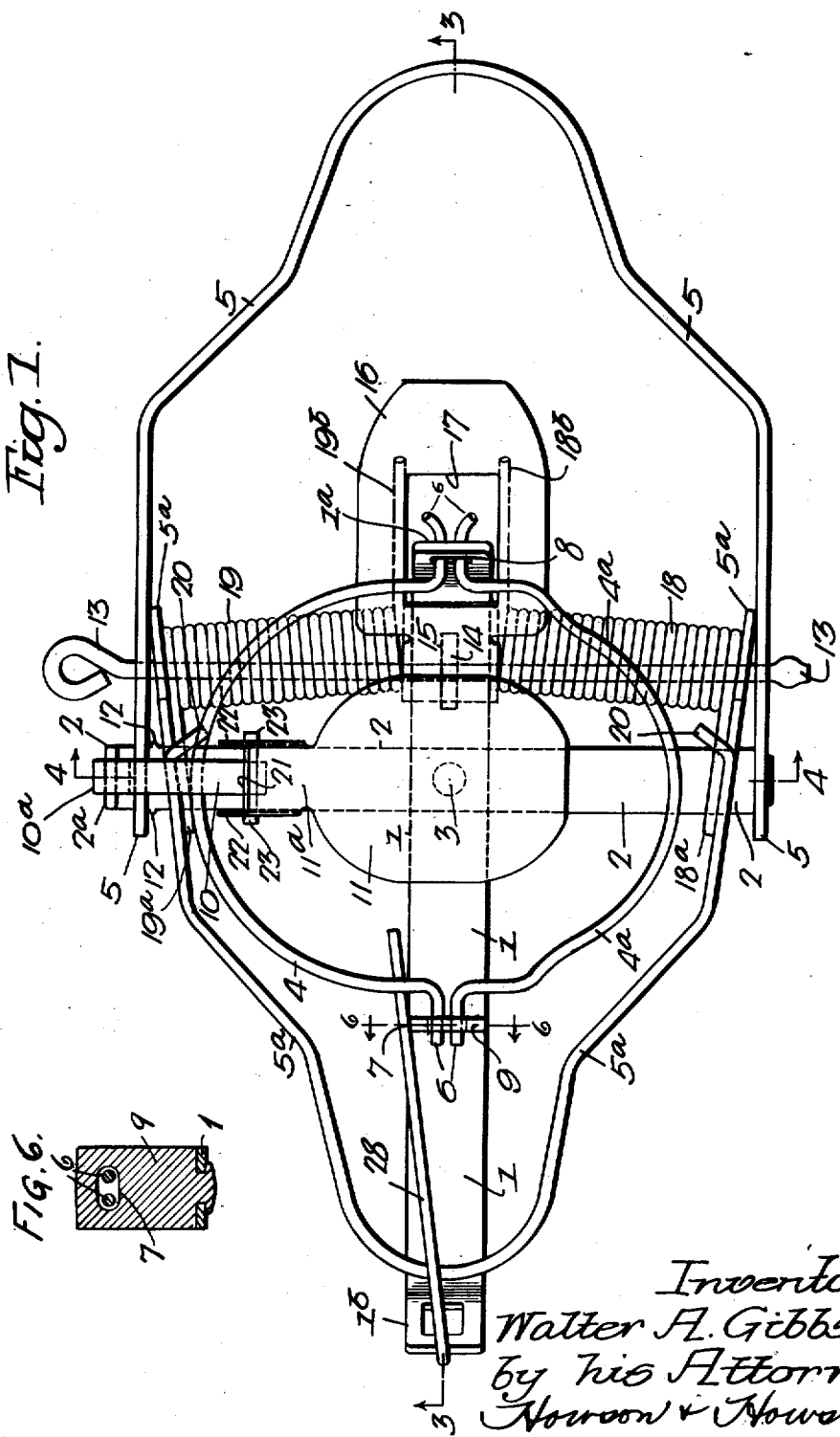

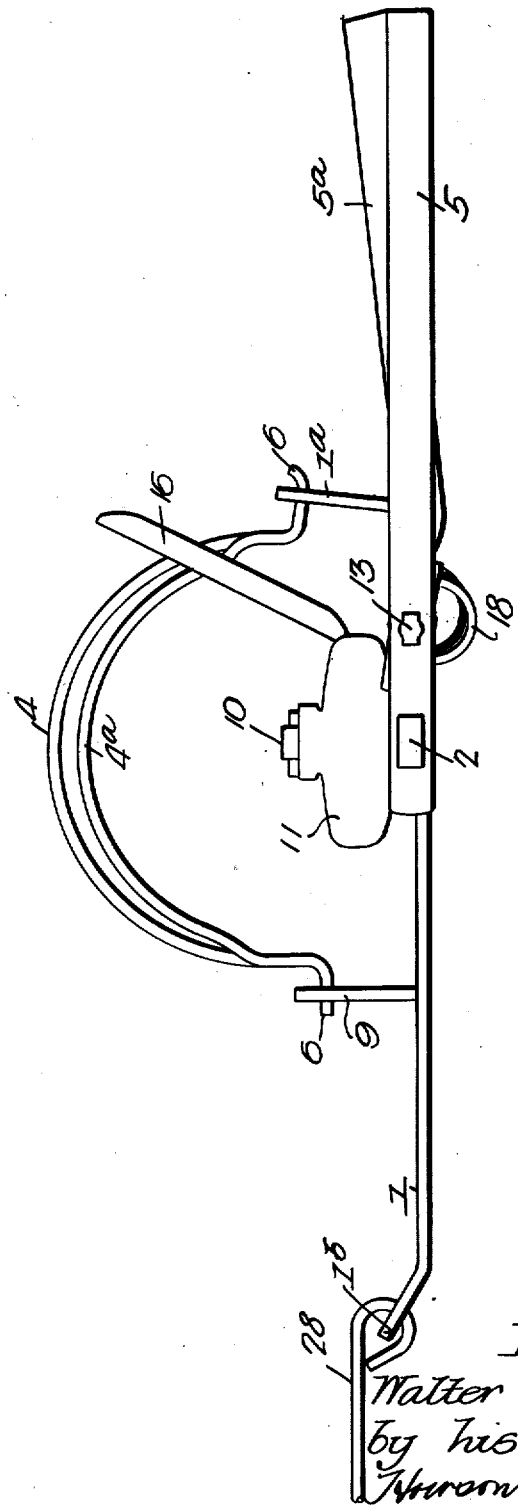

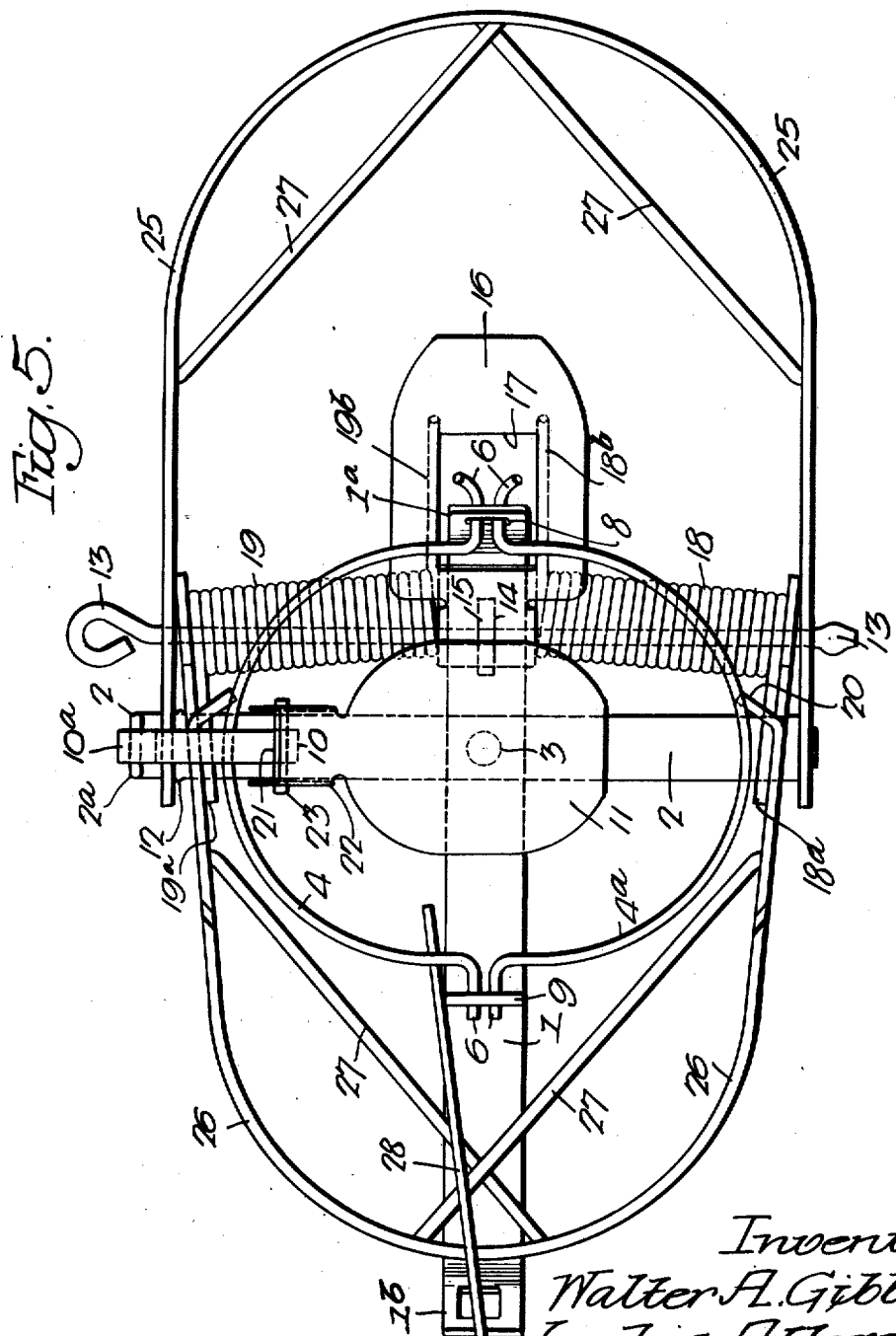

Patented June 2, 1925.

1,540,691

UNITED STATES PATENT OFFICE.

WALTER A. GIBBS, OF WILMINGTON, DELAWARE.

ANIMAL TRAP.

Application filed November 12, 1920. Serial No. 423,663.

*To all whom it may concern:*

Be it known that I, WALTER A. GIBBS, a citizen of the United States, residing in Wilmington, New Castle County, Delaware, have invented certain Improvements in Animal Traps, of which the following is a specification.

My invention relates to improvements in animal traps of the type disclosed and claimed in my pending application, Serial No. 326,053, filed September 24, 1919.

One object of my invention is to provide means for insuring the proper functioning of the secondary jaws and the catching therebetween of any animal held by the primary jaws.

Another object is to provide means whereby the treadle when the trap is set is maintained firmly in a position centrally of the trap, and further to provide means preventing the loosening of the treadle connections due to wear.

A further object is to provide a treadle by means of which the catching qualities of the trap are substantially improved, and which in manufacture involves a minimum cost.

A still further object is to provide an improved means for supporting the spring pin at the center to obviate possible distortion thereof due to the strain of the springs.

A further object is to provide means giving a greater leverage to the springs which actuate the primary jaws whereby a quicker and stronger action is obtained.

A still further object is to provide means for improving the gripping power of the jaws with a given spring pressure.

The mechanism by means of which these and still further objects which will appear hereinafter are effected will be more readily understood by consideration of the attached drawings, in which:

Figure 1, is a plan view of a trap made in accordance with my invention showing the jaws in open position;

Fig. 2, is a side elevation of the trap with the jaws in closed position;

Fig. 3, is a vertical section taken on the line 3—3, Fig. 1;

Fig. 4, is a vertical section taken on the line 4—4, Fig. 1;

Fig. 5, is a plan view of a trap with the jaws in the open positions illustrating a modification falling within the scope of my invention, Fig. 6, is a fragmentary section illustrating the detail of the mounting of the primary jaws.

With reference to the drawings, the base or foundation of the trap is formed by arms 1 and 2 suitably riveted or otherwise secured together at 3 in the form of a cross, the primary jaws 4 and $4^a$ being mounted upon the longitudinal arm 1 and the secondary jaws 5 and $5^a$ upon the lateral arm 2. The trunnions 6 of the primary jaws are mounted in the present instance in pivot holes 7 and 8 formed respectively in an upright 9 riveted or otherwise secured to the arm 1, and in the turned-up rear end $1^a$ of the said arm 1. In each case the corresponding trunnions of the jaws 4 and $4^a$ are mounted in a common pivot hole instead of, as is usually the case, in separate and distinct pivot holes.

The fixed jaw 5 of the secondary jaws is secured to the cross arm 2, the said cross arm 2 having in the present instance one end riveted in an end of the said jaw 5, while the opposite end of the arm 2 extends through an aperture $5^b$ in the opposite end of the jaw 5 and is turned upwardly, carrying at the upper end thereof a latch 10 for a treadle 11. Lateral lugs or projections 12, 12, are formed at the sides of the cross arm 2, preferably by expanding or beading out the said arm at the required points, said projections forming abutments for the end of the jaw 5, between which abutments and the upturned end $2^a$ of the cross arm the end of the jaw 5 is firmly retained. The movable jaw $5^a$ of the secondary jaws is pivotally mounted upon a pin 13, which in turn is mounted in apertures in and extends between the respective sides of the jaw 5, said pin extending through an eye 14 formed in the present instance by pressing up portion 15 of the arm 1.

Pivotally mounted upon the pin 13 is a lever arm 16 adapted when the trap is set to bear against the under side of the primary jaws, said arm having an aperture 17 therein through which when the jaws 4 and $4^a$ are in the closed positions these jaws extend, said arm 16 when the said jaws 4 and $4^a$ are in the open position lying substantially in a horizontal position with the upward extension $1^a$ of the arm 1 extending through the said aperture 17, as shown in Fig. 1. Mounted upon the pin 13, one at each side of the central arm 1, are coiled springs 18 and 19, said springs having ends 18ª and 19ª respectively engaging suitable lugs 20 upon the movable jaw 5ª and having the opposite ends 18ᵇ and 19ᵇ underlying the said arm 16. It will be seen that the springs 18 and 19 exert a pressure tending to carry the jaw 5ª when the trap is set back to the normal closed position in engagement with the arm 5, and tends also to force upwardly the arm 16 and thereby to actuate the jaws 4 and 4ª of the primary jaws. As shown in Figs. 2 and 3, the arm 16 may be flanged rearwardly at the sides to prevent possible displacement from under the arm of the ends 18ᵇ and 19ᵇ of the springs.

The pan or treadle 11 is mounted upon an upright 21 on the cross arm 2, said treadle in the present instance being made of an integral piece of metal having at the rear thereof a neck 11ª from each side of which extend downwardly perforated ears or lugs 22. The upright 21 has at each side of the top thereof a projection 23, which projections are adapted to extend through the said apertured lugs 22 and to form pivot supports for the treadle 11. The outer end 10ª of the latch 10 extends through an aperture 24 in the turned-up end 2ª of the cross piece 2, and is beaded over to form an eye providing for free pivotal motion of the latch. The free end of the latch is adapted to overlie the jaw 4 of the primary jaws and to engage the under side of the extension 11ª of the treadle 11 between the lugs 22, the said jaw 4 bearing upwardly against the latch under the tension of the springs 18 and 19 acting through the arm 16, as in the manner heretofore explained, and thereby tending to retain the main portion of the treadle 11 in an elevated position, as most clearly shown in Fig. 4. Downward movement of the treadle effects disengagement of the latch 10 in the well known manner, releasing the primary jaws.

The formation of the treadle 11, as hitherto explained, is such that when the trap is set and the latch 10 underlies the end of the treadle, the tension of the springs exerted upon the treadle at the point where the latch 10 contacts therewith is divided between the lugs 22, the result being a balanced triangle of forces which tends to retain the treadle in a fixed position and prevents wabbling of the treadle and lateral displacement. The treadle is thus held in the exact center of the trap and any animal releasing the trap will consequently be in a position most favorable for effective action of the jaws.

The jaw 4ª of the primary jaws, as most clearly shown in Fig. 2, is made in part of somewhat smaller diameter than the jaw 4, the edges of the jaws as a consequence not lying flush together, as in traps of the usual form, but being slightly offset, the effect of this arrangement being to give, in addition to the clamping, a twisting effect which materially increases the retaining ability of the jaws.

It will also be seen, by reference to Fig. 1, that the jaws 5 and 5ª of the secondary trap, instead of being of the usual oval or rounded shape, are cut inwardly at the sides, the purpose of this formation being to insure the secondary jaws taking effect. In the form of jaw commonly employed, which is of generally rounded shape, it sometimes happens that the jaws pass entirely over the body of the animal without striking or taking hold thereof, but in a jaw or jaws so constructed as to give only sufficient room for passage over the primary jaws when the latter are in the closed position, the effectiveness of the secondary jaws is insured.

In Fig. 5, I have illustrated a modification in the form of the secondary jaws 25 and 26, these jaws being rounded, as clearly shown, and having struts or cross pieces 27 so placed that while giving clearance for the primary jaws, they come sufficiently close to the latter in the closed position to insure their taking effect upon the body of any animal which may be held thereby.

It is clear that a variety of different forms of jaws may be used for the purpose stated, such for example as solid plates in the place of the jaws 25 and 26, the plate of the movable jaw being cut out to provide clearance for the primary jaws.

The secondary jaw 5ª is held in its open position by a latch 28, one end of which is loosely mounted in the apertured end 1ᵇ of the arm 1, the body portion overlying the outer or free end of the jaw 5ª, while the free end of the latch 28 lies under the jaw 4 adjacent its fulcrum. The jaws 4 and 4ª are held in their open position by the latch 10, as previously described.

I claim:

1. In an animal trap, the combination with actuating means therefor, of a pair of cooperating jaws having parallel axes, the animal-gripping parts of said jaws being offset with respect to each other, and means for preventing passage of one jaw by the other when brought together by said actuating means.

2. In an animal trap, the combination of a pair of cooperating jaws having parallel axes, the animal-gripping portion of one jaw standing above the corresponding portion of the other jaw when in closed position, with automatic means for bringing said jaws together, and normally releasable means for retaining the jaws in open position, together with means for preventing passage of one jaw by the other when brought together by said actuating means.

3. In an animal trap, the combination of a supporting frame, primary and secondary gripping elements mounted on the frame, a pin extending across the frame and provided with supports at its ends, at least one spring mounted on said pin for actuating the gripping elements, a loop in said frame engaging the pin intermediate the ends thereof to prevent distortion and displacement thereof, and animal releasable means for retaining the gripping elements in open position.

4. In an animal trap, the combination of a frame comprising a longitudinal member and a cross piece, a pair of movable co-operating jaws mounted on said longitudinal member, a fixed jaw having one end fixed to one end of the said cross piece, an aperture in the other end of said fixed jaw through which the corresponding end of the said cross piece passes, means on said cross piece limiting the movement of the end of said fixed jaw inwardly upon the cross piece, and the end portion of the cross piece turning upwardly whereby the said apertured end of the fixed jaw is held immovable.

5. An animal trap having jaws constituting primary gripping means, and secondary gripping means adapted to contact with an animal held by the primary means and to force said animal out of its normal position as held by said primary means, with at least one jaw of said secondary means having a part of its opening of lesser size than the remainder to prevent passage of an animal therethrough.

6. An animal trap comprising a base structure and jaws constituting primary gripping means, and secondary gripping means adapted to contact with an animal held by the primary means and to force said animal out of its normal position as held by said primary means, with at least one jaw of said secondary means having that portion of its opening where it attaches to the trap of different size from the outer animal-gripping portion.

7. An animal trap comprising a base structure and jaws constituting primary gripping means, and secondary gripping means adapted to contact with an animal held by the primary means and to force said animal out of its normal position as held by said primary means, with at least one jaw of the secondary means being of irregular shape affording an opening at the outer animal-gripping part smaller than the opening in that part attaching to said base structure.

8. An animal trap comprising primary gripping means, and secondary gripping means including a jaw mounted astraddle of and adapted to swing over said primary means, said jaw having a portion thereof extending inwardly to limit the clearance between the jaw and said primary means to insure maintaining contact between said jaw and an animal retained by the primary gripping means.

9. An animal trap having jaws constituting primary gripping means, and secondary gripping means adapted to contact with an animal held by the primary means and to force said animal out of a normal position with respect to said primary means, and means restricting the effective span of the outer portion of at least one jaw of the secondary gripping means to prevent passage of an animal therethrough.

10. An animal trap comprising jaws constituting primary and secondary gripping means, with means restricting the effective span of that part of at least one jaw of said secondary means which is adapted normally to contact with an animal retained by said primary means.

11. An animal trap having jaws constituting primary gripping means, and secondary gripping means comprising at least one jaw adapted to move over the primary means, said jaw having an opening greater than required for clearing said primary means and restricted in the animal-engaging portion thereof to prevent passage of the animal therethrough.

12. An animal trap having jaws constituting primary gripping means, and secondary gripping means comprising at least one jaw adapted to move over the primary means, said jaw having an opening sufficient to provide clearance between the jaw and the primary means, with the portions of said jaw extending beyond said opening effectively closed to prevent passage of an animal therethrough.

13. In a trap, the combination with actuating means therefor, of a pair of primary jaws, secondary gripping means actuable following actuation of said primary jaws and including a jaw mounted astraddle of and adapted to swing over said primary jaws, said secondary jaw having portions thereof extending inwardly toward the primary jaws and passing in close proximity thereto when the said secondary jaw is actuated.

14. In an animal trap, the combination with a pair of pivotally mounted jaws, of a closing lever embracing the jaws and pivotally mounted between the jaw pivots, a spring bearing against the back of the lever and adapted to elevate the lever to close the jaws, and means on the lever for preventing displacement of the spring from behind the lever.

15. In an animal trap, the combination with a pair of pivotally mounted jaws, of a substantially flat closing lever embracing the jaws and pivotally mounted between the jaw pivots, a coiled spring having one end bearing against the back of the lever and adapted to elevate the latter to close the jaws, and a flange at the side of the lever to prevent displacement of the end of the spring from behind the lever.

16. In an animal trap, the combination with a pair of pivotally mounted jaws, a latch for maintaining the jaws in open relation, a treadle operatively associated with the latch and mounted between the jaws when the latter are open, a closing lever embracing the jaws and pivotally mounted at one side of the trap intermediate the jaw pivots, and a spring adapted to actuate the lever to close the jaws.

WALTER A. GIBBS.

DISCLAIMER 1,540,691.—*Walter A. Gibbs*, Wilmington, Del. ANIMAL TRAP. Patent dated June 2, 1925. Disclaimer filed October 11, 1930, by the patentee.

Hereby enters this disclaimer to claims 14 and 15 in said specification which are in the following words, to wit:

"14. In an animal trap, the combination with a pair of pivotally mounted jaws, of a closing lever embracing the jaws and pivotally mounted between the jaw pivots, a spring bearing against the back of the lever and adapted to elevate the lever to close the jaws, and means on the lever for preventing displacement of the spring from behind the lever.

"15. In an animal trap, the combination with a pair of pivotally mounted jaws, of a substantially flat closing lever embracing the jaws and pivotally mounted between the jaw pivots, a coiled spring having one end bearing against the back of the lever and adapted to elevate the latter to close the jaws, and a flange at the side of the lever to prevent displacement of the end of the spring from behind the lever."

[*Official Gazette November 4, 1930.*]